(12) United States Patent
Ioannone et al.

(10) Patent No.: US 7,448,314 B2
(45) Date of Patent: Nov. 11, 2008

(54) DEVICE FOR PRODUCING MILK FOAM

(75) Inventors: Matteo Ioannone, Steinmaur (CH); Andreas Hubacher, Rothrist (CH)

(73) Assignee: Niro-Plan AG, Aaburg (CH)

( * ) Notice: Subject to any disclaimer, the term of this patent is extended or adjusted under 35 U.S.C. 154(b) by 544 days.

(21) Appl. No.: 11/050,216

(22) Filed: Feb. 3, 2005

(65) Prior Publication Data
US 2005/0172833 A1 Aug. 11, 2005

(30) Foreign Application Priority Data
Feb. 6, 2004 (DE) ........................ 10 2004 006 095

(51) Int. Cl.
*A47J 31/44* (2006.01)
(52) U.S. Cl. ................ 99/452; 99/323.1; 261/DIG. 76; 134/22.12
(58) Field of Classification Search .................. 99/293, 99/323.1, 287, 286, 453, 452; 261/DIG. 76; 134/22.12, 22.11
See application file for complete search history.

(56) References Cited

U.S. PATENT DOCUMENTS 5,526,841 A * 6/1996 Detsch et al. ............ 137/15.04
5,549,036 A * 8/1996 Hourizadeh .................. 99/286
6,019,032 A * 2/2000 Arksey ........................ 99/452

FOREIGN PATENT DOCUMENTS

| DE | 38 38 235 A1 | 6/1989 |
| DE | 199 55 195 A1 | 5/2001 |
| DE | 697 08 210 T2 | 6/2002 |
| EP | 0 472 272 B1 | 9/1996 |
| EP | 0 803 219 A1 | 10/1997 |
| EP | 1 374 748 A2 | 1/2004 |
| WO | WO 2004/004523 A1 | 1/2004 |

* cited by examiner

*Primary Examiner*—Reginald L Alexander
(74) *Attorney, Agent, or Firm*—Panitch Schwarze Belisario & Nadel LLP

(57) ABSTRACT

A device is provided for producing milk foam, in particular in combination with an automatic coffee machine, which has a mixing chamber (13) to which milk, air, and rinsing medium can be supplied via various supply lines (11, 20, 21), wherein the supply of the rinsing medium to the mixing chamber takes place at least partially via the milk supply line (11). Here it is essential that the air supply line (20), at least with its end segment (20a) connected to the mixing chamber (13), can be selectively connected via a valve (22) to a line (23) having rinsing medium.

14 Claims, 1 Drawing Sheet

DEVICE FOR PRODUCING MILK FOAM

BACKGROUND OF THE INVENTION

The present invention relates to a device for producing milk foam, in particular in connection with an automatic coffee machine, comprising a mixing chamber to which at least milk, air, and a rinsing medium can be supplied via various supply lines, wherein the supply of the rinsing medium to the mixing chamber takes place at least partially via the milk supply line.

The foaming of milk is required primarily in the making of cappuccino, but is also necessary for other purposes. In this process, milk is mixed with air and steam. A problem here is that the line segments charged with milk, in particular foamed milk, become clogged over time, because the milk dries onto these segments. In addition to the functional disturbances caused by this, these deposits also result in adverse sensory effects due to the congealed albumen and the breakdown of casein.

In order to avoid deposits of this sort, it is already known to regularly rinse the mixing chamber and the lines through which milk flows. Thus, for example in German patent application DE 199 55 195 A1 a coffee machine is described in which a rinsing medium (cold water or steam in the embodiment given there) is pumped both through the milk supply line and also directly into the mixing chamber. Here, the steam introduced directly into the mixing chamber can optionally be used to clean this chamber or to heat the milk during the preparation of drinks.

This known apparatus has proven successful in practice. The present invention is intended to further improve it with respect to its rinsing and cleaning effect. At the same time, the present invention should be distinguished by a high degree of functionality and an economical design.

BRIEF SUMMARY OF THE INVENTION

This object is achieved according to the present invention in that the air supply line can optionally be connected, at least with its end segment connected to the mixing chamber, via a valve to a line having rinsing medium. Thus, in the future it will be possible to rinse not only the line that is directly charged with milk, but also the air supply line. The background of this additional rinsing operation is the following: Examinations by applicant have shown that during the foaming of milk, particularly at high temperatures, the foam can penetrate into the air supply line from the mixing chamber. Consequently, the air supply line is surprisingly also a possible source of adverse sensory effects. This risk is eliminated by the rinsing of the air supply line according to the present invention.

The mentioned valve, by which the air supply line can be connected to a rinsing medium, is usefully positioned at a clear distance from the mixing chamber, in particular at a higher level than this chamber. In this way, it is ensured that the region of the air line, into which the milk foam may possibly penetrate, is certain to be charged with rinsing medium.

With respect to the constructive design of the mentioned valve, it is recommended to selectively connect the air line with a source of air or with the rinsing medium. In other words, the valve either creates a connection to the air source with simultaneous blocking of the rinsing medium, or it creates a connection to the rinsing medium with simultaneous blocking of the air source. In the simplest case, a double valve can be used for this purpose, which is connected to a common actuating element, in particular to a conventional electromagnet.

As a rinsing medium for the air supply line, in principle all suitable agents in liquid form or gas form may be considered. Usefully, the medium already present for the rinsing of the milk supply line is also used for the air supply line. Here, it is particularly advantageous if cold water or a solution with chemical additives is first used as a rinsing medium, followed by steam or compressed air to clear the line.

The triggering of the rinsing operation for the air supply line, and usefully also for the milk supply line, can take place via a time control device, that automatically carries out the rinsing after each drink preparation or after a predetermined number of preparations. Here, it is also recommended to make the triggering of the rinsing process dependent on there being no drink vessel underneath the spout of the coffee machine, which can be monitored using appropriate sensors.

Finally, in an improvement of the basic concept of the invention, it is recommended that a check valve be arranged in the air supply line, downstream of the mentioned valve in the air supply line, in particular in the area of entry into the mixing chamber. This check valve reduces the penetration of milk, and consequently also reduces the required rinsing and cleaning expense.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
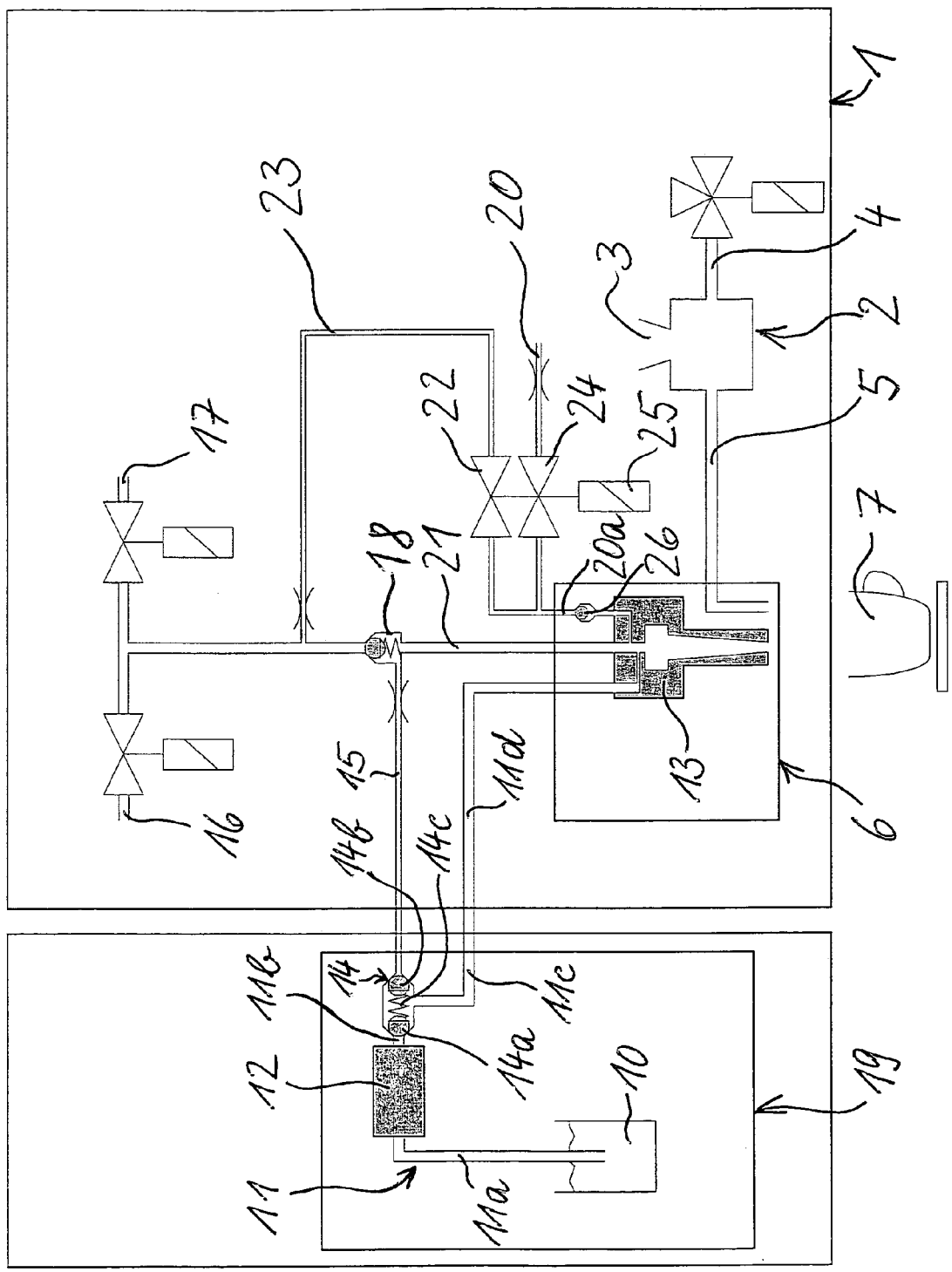
FIG. 1 is a schematic flow diagram illustrating a coffee machine having a rinsing device according to the present invention.

In the drawing (FIG. 1), at the right a large outlined rectangular area can be seen that indicates a coffee machine 1. At its right lower side, it has a brewing assembly 2 having a coffee supply 3 and a hot water supply 4, from which the brewed coffee is transported via a coffee line 5 to a spout 6, and from there is supplied to a coffee cup 7 positioned under the spout.

The milk is stored in a storage container 10 and is transported via a milk line 11, using a pump 12, to a mixing chamber 13, which is likewise provided in the area of the spout of the coffee machine above the coffee cup. Milk line 11 is essentially divided into four sections, namely section 11a between the storage container 10 and the pump 12, section 11b between pump 12 and a rinsing line connection 14 (described in more detail below), section 11c between rinsing line connection 14 and a cooling boundary (also described in more detail below), and section 11d between the cooling boundary and mixing chamber 13.

The mentioned rinsing line connection 14 connects milk line 11 with a rinsing line 15, which is connected to a cold water supply 16 and to a steam supply 17, so that cold water or steam serve as a rinsing medium. Rinsing line connection 14 is designed as a double-acting check valve having two spherical valve elements 14a, 14b and a spring 14c that biases both valve elements against the inlets of the connected milk line and rinsing line.

If milk pump 12 is actuated, valve element 14a, which seals the milk line, is pressed away against the force of the spring and opens the milk line, so that the milk can flow into mixing chamber 13 via sections 11c and 11d. Similarly, an opening of the cold water supply 16 or steam supply 17 results in a further check valve 18 opening the path of the water or the steam into rinsing line 15, so that valve element 14b, which blocks the entry of the rinsing line into rinsing line connection 14, is pressed inward against the spring force of spring element 14c, and the rinsing medium can flow into the mixing chamber via sections 11c and 11d of milk line 11, and can rinse this mixing chamber. Moreover, cold water or steam can be conducted directly from check valve 18 into mixing chamber 13 via a water/steam line 21, and can thus be used for the direct cleaning of the mixing chamber, the steam also being used to heat the milk.

The cooling boundary mentioned above is indicated by the dashed-line rectangle 19 at the left, which represents a cooled area, in particular a refrigerator, which encloses and cools milk storage container 10, line section 11a, pump 12, line section 11b, rinsing line connection 14, and line section 11c. Line sections 11a, 11b, and 11c thus represent as a whole a cooled portion of milk supply line 11. In this way, the milk in this cooled area is kept at a temperature low enough to prevent the formation of lactic acid or casein. Consequently, the cooled areas charged with milk also require little cleaning, so that a periodic rinsing with the aid of a milk cleaning agent introduced into the milk storage container is sufficient. The cooled and uncooled areas that are charged with milk and are connected downstream from the rinsing line connection, i.e., cooled section 11c and uncooled portion 11d of the milk line situated after the cooling boundary, can be easily rinsed by the steam or by the cold water at very short intervals. In a known manner a problem-free cleaning of all areas charged with milk is thereby ensured.

An essential feature is the air supply line 20 connected to mixing chamber 13. This line supplies the ambient air required for the foaming of the milk, and can at the same time be used to bleed air from the system. This air line 20, together with its segment 20a opening into mixing chamber 13, is connected to a rinsing medium via a valve 22 and a line 23; namely, it is connected to the already-mentioned cold water supply 16 or steam supply 17. This makes it possible to rinse at any time not only the line sections charged with milk, but also segment 20a of air supply line 20, which opens into the mixing chamber. If necessary, this rinsing operation can be followed by again blowing the line clear with air from a compressed air source, not shown in the drawing.

In addition, it can be seen in the drawing that air supply line 20 has a separate valve 24, and that this valve is combined with the above-mentioned valve 22 and is adjusted by an actuating element 25 that is common to both valves. The valves are connected together in such a way that either valve 22 is open and valve 24 is closed, or instead valve 22 is closed and valve 24 is open.

While the introduction of water or steam via valves 16 or 17 takes place using pumps, not shown in the drawing, no pump is provided for the supply of air via line 20; instead, here the air is to be suctioned by reduced pressure (vacuum) in mixing chamber 13, in particular by application of the Venturi principle. However, it will be understood to be within the scope of the invention to connect line 20 to a compressed air source, in particular if the line is again to be blown dry after rinsing with a liquid rinsing medium.

Finally, the drawing shows that diaphragms are built into each of lines 15, 20, and 23, and act to control the flow quantities.

In sum, the present invention thus offers the advantage that, by the rinsing of air supply line 20, a further improvement of the hygienic and sensory conditions in the coffee machine is achieved, requiring no additional time expense, because the air supply line can be rinsed at the same time as the milk supply line.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A device for producing milk foam, comprising a mixing chamber (13), a milk supply line (11) for supplying milk to the mixing chamber, an air supply line (20) for supplying air to the mixing chamber, and a rinsing medium supply line (21) for supplying rinsing medium to the mixing chamber, the air supply line (20) having an end segment (20a) connected to the mixing chamber (13), the end segment being selectively connectable via a first valve (22) to a rinsing medium line (23), and a rinsing line (15) supplied with rinsing medium being connectable to the milk supply line (11) by a connection (14), such that the rinsing medium can be supplied to the mixing chamber at least partially via the milk supply line (11) and at least partially via the air supply line (20), wherein the first valve (22) is arranged at a distance from the mixing chamber (13) and at a higher level than the mixing chamber.

2. The device according to claim 1, wherein the first valve (22) selectively connects at least the end segment (20a) of the air supply line (20) to an air source or to the rinsing medium.

3. The device according to claim 2, wherein the rinsing medium supply line (21) is a water/steam supply line.

4. The device according to claim 1, wherein the first valve (22) is a double valve (22, 24) connected to a common actuating element (25).

5. The device according to claim 1, wherein the milk supply line (11) and at least the end segment (20a) of the air supply line (20) are connectable to the same rinsing medium.

6. The device according to claim 1, wherein the rinsing medium comprises first a liquid and thereafter a gas.

7. The device according to claim 6, wherein the gas comprises a compressed gas.

8. The device according to claim 1, wherein the first valve (22) is connected at least to a time controller for triggering a rinsing process.

9. The device according to claim 1, further comprising a check valve (26) arranged in the end segment (20a) of the air supply line (20) downstream from the first valve (22).

10. The device according to claim 1, wherein the device is part of an automatic coffee machine.

11. A method for rinsing a device for producing milk foam, the device comprising a mixing chamber (13) and supply lines (11, 20, 21) for respectively supplying at least milk, air, and rinsing medium to the mixing chamber, wherein the air supply line (20) has an end segment (20a) connected to the mixing chamber, the end segment being selectively connectable via a valve (22) to a rinsing medium line (23), wherein the valve (22) is arranged at a distance from the mixing chamber (13) and at a higher level that the mixing chamber, and a rinsing line (15) supplied with rinsing medium being connectable to the milk supply line (11) by a connection 14 the method comprising supplying the rinsing medium to the mixing chamber (13) at least partially via the milk supply line (11), and subjecting at least the end segment (20*a*) to a rinsing operation.

12. The method according to claim 11, wherein the rinsing operation for at least the end segment (20*a*) begins with liquid and ends with blowing the end segment clear with steam and/or compressed air.

13. The method according to claim 11, further comprising rinsing the milk supply line (11) and the air supply line (20) at least partially simultaneously.

14. The device according to claim 1, wherein the connection (14) is a double-acting check valve in which valve elements are biased against inlets of the milk supply line and the rinsing line.

\* \* \* \* \*